(12) United States Patent
Warke

(10) Patent No.: US 11,925,148 B2
(45) Date of Patent: Mar. 12, 2024

(54) CORRUGATED PIPING ASSEMBLY AND SLEEVE FOR SAME

(71) Applicant: Netafim, Ltd., Tel Aviv (IL)

(72) Inventor: Kumar Warke, Haridwar (IN)

(73) Assignee: Netafim, Ltd., Tel Aviv (IL)

(*) Notice: Subject to any disclaimer, the term of this patent is extended or adjusted under 35 U.S.C. 154(b) by 540 days.

(21) Appl. No.: 17/197,118

(22) Filed: Mar. 10, 2021

(65) Prior Publication Data
US 2021/0212274 A1 Jul. 15, 2021

Related U.S. Application Data

(63) Continuation-in-part of application No. PCT/IB2019/057367, filed on Aug. 31, 2019.

(60) Provisional application No. 62/729,555, filed on Sep. 11, 2018.

(51) Int. Cl.
*A01G 25/02* (2006.01)
*F16L 25/00* (2006.01)
*F16L 53/00* (2018.01)
*F16L 11/15* (2006.01)

(52) U.S. Cl.
CPC ........ *A01G 25/026* (2013.01); *F16L 25/0036* (2013.01); *F16L 53/00* (2013.01); *F16L 11/15* (2013.01)

(58) Field of Classification Search
CPC .............................. F16L 33/26; F16L 25/0036
See application file for complete search history.

(56) References Cited

U.S. PATENT DOCUMENTS

| | | | | |
|---|---|---|---|---|
| 4,288,110 A | * | 9/1981 | Grenell | F16L 33/26 |
| 4,314,717 A | | 2/1982 | Bjurman | |
| 4,400,022 A | * | 8/1983 | Wright | F16L 25/0036 |
| 4,635,972 A | | 1/1987 | Lyall | |
| 5,794,986 A | * | 8/1998 | Gansel | F16L 25/0036 |
| 5,842,727 A | * | 12/1998 | Shade | F16L 25/0036 |
| 8,403,371 B1 | * | 3/2013 | Kawabata | F16L 25/0036 |
| 8,978,712 B2 | | 3/2015 | Babl et al. | |
| 2002/0158468 A1 | | 10/2002 | Ikegami et al. | |
| 2005/0099005 A1 | | 5/2005 | Fullbeck et al. | |
| 2007/0252389 A1 | * | 11/2007 | Milici | F16L 25/0036 |
| 2009/0260216 A1 | | 10/2009 | Avnon | |
| 2019/0128450 A1 | * | 5/2019 | Shin | F16L 33/26 |

FOREIGN PATENT DOCUMENTS

DE 202006014736 U1 11/2007
EP 0824205 2/1998

OTHER PUBLICATIONS

International Search Report dated Oct. 28, 2019, in counterpart International (PCT) Application No. PCT/IB2019/057367.
Written Opinion dated Oct. 28, 2019, in counterpart International (PCT) Application No. PCT/IB2019/057367.

* cited by examiner

*Primary Examiner* — Zachary T Dragicevich
(74) *Attorney, Agent, or Firm* — Womble Bond Dickinson (US) LLP

(57) ABSTRACT

A corrugated piping assembly for use in an irrigation system for bridging between different pipe sections and/or irrigation appliances. The assembly has a corrugated pipe section fitted at a rear end to a connector and a sleeve overlaying a region where the pipe section fits over the connector. The sleeve is arranged to press inwards against the pipe section to press it against portions of the connector.

18 Claims, 6 Drawing Sheets

CORRUGATED PIPING ASSEMBLY AND SLEEVE FOR SAME

RELATED APPLICATIONS

This is a Continuation-in-Part of International Patent Application No. PCT/IB2019/057367, filed 31 Aug. 2019 and published as WO 2020/053696A1 on 19 Mar. 2020. Priority is claimed to U.S. Provisional Patent Application No. 62/729,555, filed 11 Sep. 2018. The contents of the aforementioned applications are incorporated by reference in their entirety.

TECHNICAL FIELD

Embodiments of the invention relate to a corrugated piping assembly and sleeve for same, in particular for use in irrigation pipes.

BACKGROUND

Irrigation systems, such as those including drip irrigation pipes, sprinklers or the like; may require bridging between pipes/conduits within the system—for example between a main distribution pipe that is laid along a field and drip pipes that branch away from the distribution pipe to irrigate crops in the field.

During setup or use of such irrigation systems, changes or shifting in relative position between pipes within the system, e.g. between drip pipes and the main distribution pipe may occur, resulting in some cases in damages or leaks that may occur at a region for the drip pipes and distribution pipe meet and merge.

Corrugated pipe sections typically provide on the one hand rigidity while permitting flexibility that may be required at regions where piping sections meet.

U.S. Pat. No. 4,314,717 for example describes a flexible plastic nipple for coupling a sprinkler head to a sprinkler system pipeline. The nipple includes an elongated plastic tube having a resilient center section and a pair of end sections. The center section has a uniform set of annular undulations which provides both rigidity and flexibility to the nipple. Each end section includes a rigid portion, a flexible threaded section, and a snub portion for mating the nipple with a connector fitting on the sprinkler head or pipeline. The threaded portions have sufficient flexibility to prevent rupturing or stripping when a force is transmitted to the nipple.

U.S. Pat. No. 8,978,712 as a further example describes a flexible tube with at least one folding bellows which has a plurality of convolutes which have been formed in the wall of the tube and which run across an external surface of the tube, where there is no separation between the convolutes in an axial longitudinal direction of the tube and the folding bellows has at least one convolute which has two opposite bending zones and two restricted elongation zones, where the arrangement has the restricted elongation zones between the opposite bending zones.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIG. 1A shows a sleeve axially aligned with a corrugated pipe section. FIG. 1B shows the sleeve after it has been slid onto the corrugated pipe section. FIG. 1C shows a heating tool to help form the corrugated piping assembly. FIG. 1D shows the corrugated pipe section mounted on the tool of FIG. 1C. FIG. 1E shows a connector placement tool before the connector is fitted onto the corrugated pipe section. FIG. 1F show the connector placement tool after the connector is fitted over the corrugated pipe section.

Figure 1:
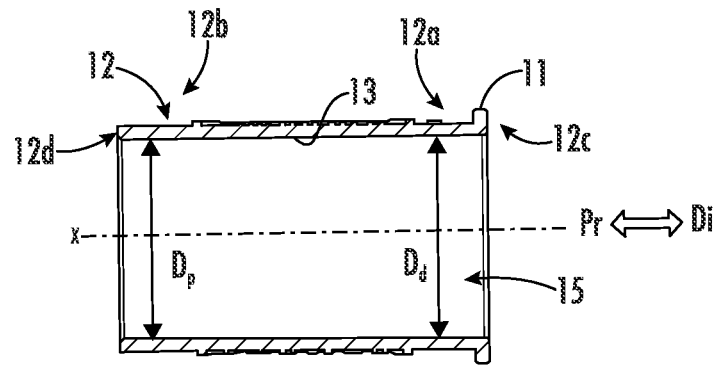
FIG. 1 shows a sleeve in accordance with one embodiment of the present invention.
Figure 1A:
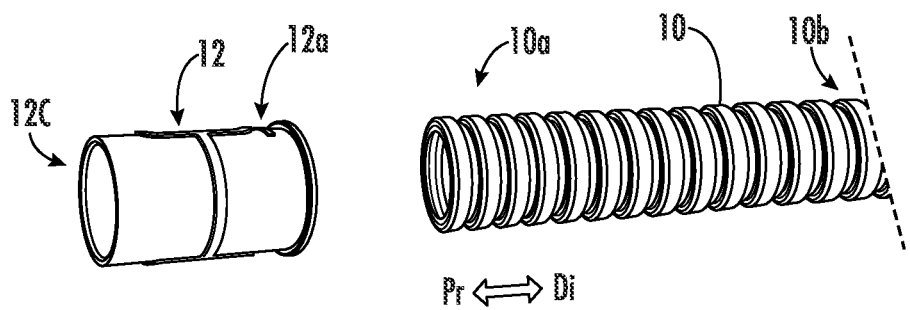
FIGS. 1A to 1F schematically show various possible stages that may be taken for forming a corrugated piping assembly according to at least certain embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

FIG. 1 shows a protective sleeve 12 in accordance with one embodiment of the present invention. The protective sleeve 12 has a first sleeve end 12a and a second sleeve end 12b with a peripheral collar 11 formed at the first sleeve end 12a. A first sleeve abutment 12c is formed on the collar at the first sleeve end 12a, while a second sleeve abutment 12d is formed on an annular end surface at the second sleeve end 12b.

Figure 2A:
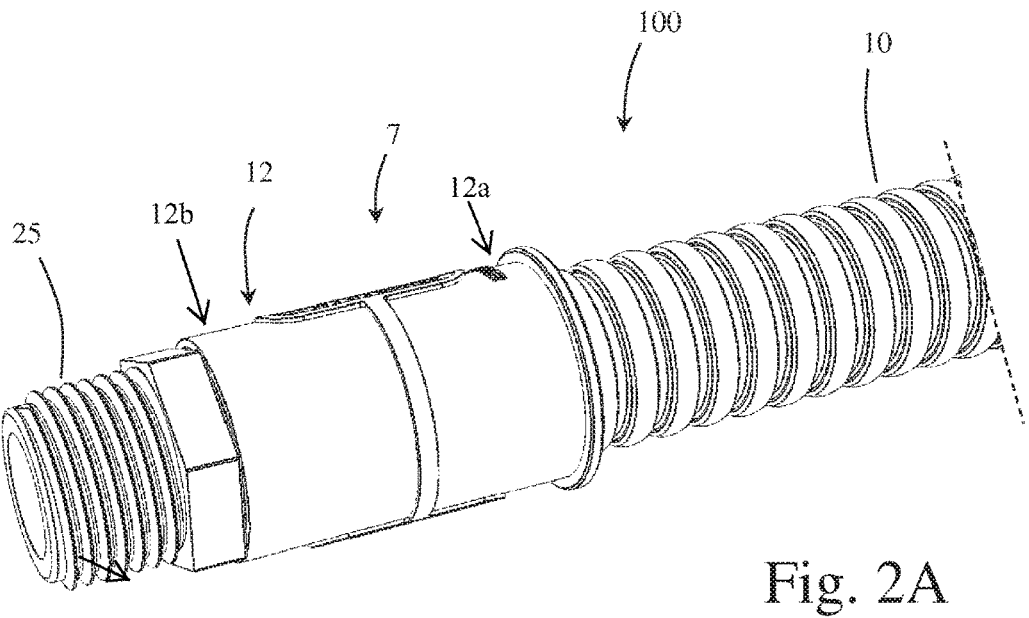
FIGS. 2A to 2C schematically show perspective (FIG. 2A) and cross-sectional views (FIGS. 2B and 2C), respectively, of a corrugated piping assembly according to an embodiment of the present invention.
Figure 2B:
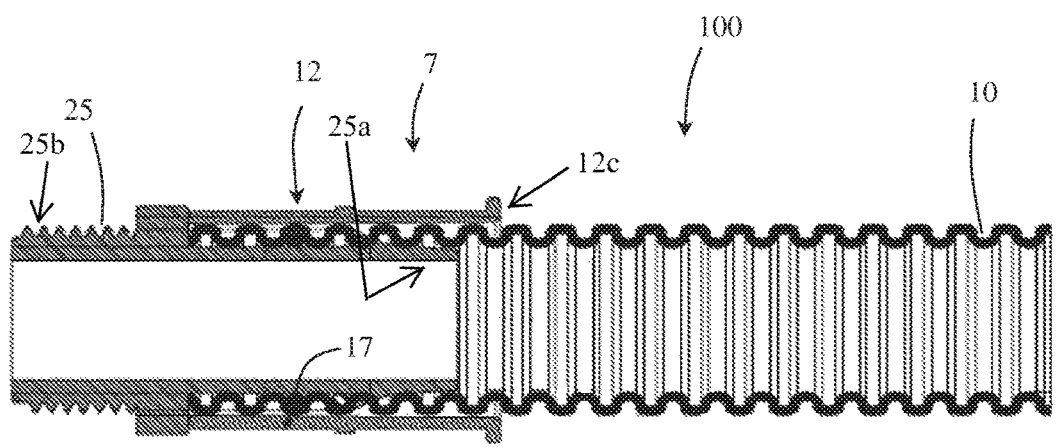
Figure 2C:
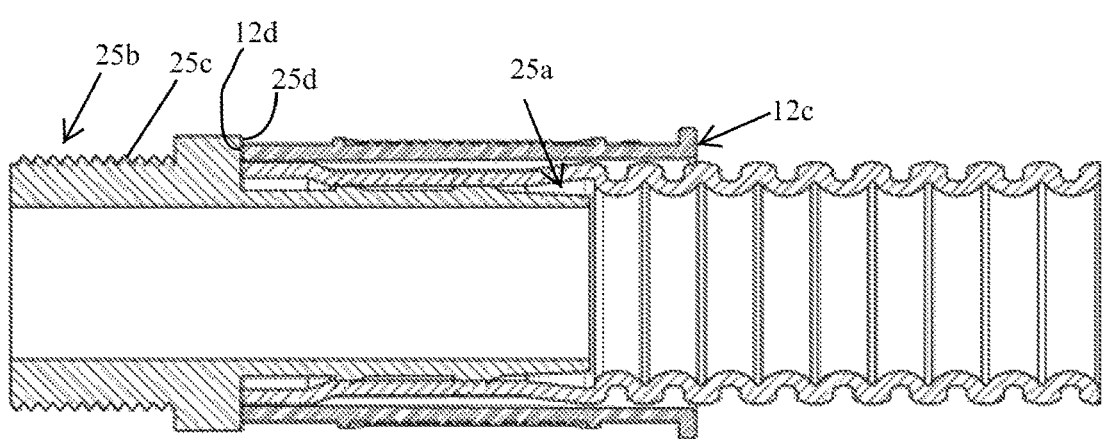

As seen in FIGS. 2A-2C, the corrugated pipe assembly has 100 a coupling region 7 and comprises a corrugated pipe section 10, a connector 25 and the aforementioned protective sleeve 12. The corrugated pipe section 10 has a pipe proximal end 10a where the coupling region 7 is located, and an opposite, pipe distal end 10b away therefrom. The connector 25 has a first connector end 25a and a second connector end 25b, the second connector end 25b preferably being provided with a threaded portion 25c for screw-coupling the assembly to a larger pipe, such as a main distribution pipe 110 seen in FIG. 3.

As seen in FIGS. 2B and 2C, the connector 25 has a connector stop 25d located between the first and second collar ends. The connector abutment 25d may be formed on an integrally formed nut configured to be received into a wrench for attaching the corrugated piping assembly to a distribution pipe. In the assembled corrugated piping assembly, the sleeve's second sleeve abutment 12d abuts the connector stop 25d. During the assembly process (described below, the connector stop 25d prevents further relative movement between the sleeve 12 and the connector 25.

Attention is now drawn to FIGS. 1A to 1F providing possible steps that may be taken for forming an embodiment of a coupling region 7 (see indicated in FIGS. 2A and 3) in at least certain corrugated piping assembly embodiments of the present invention.

In a first possible step (see FIGS. 1A and 1B), an embodiment of a protective sleeve 12 is seen being placed over one (proximal) end 10a of a corrugated pipe section 10 as a first possible step of forming a coupling region at this end. Although in the assembly steps to be described herein formation of a coupling region 7 at only one end of a pipe section 10 is seen—it is noted that coupling regions at both ends of such pipe section may be formed in at least certain corrugated piping assembly embodiments.

The placement of the sleeve 12 here over pipe section 10 may be performed by manually sliding/urging the first end 12a of the sleeve 12 over the corrugations/bellows of the pipe section 10 in a distal direction Di relative to a pipe coupling end 10a where a coupling region 7 is to be formed.

It is noted that the directional terms of distal Di and proximal Pr refer, respectively, to proximity and remoteness to a pipe section's open end of elements/features along a pipe section where a coupling region is to be formed.

As seen in the enlarged view of FIG. 1, sleeve 12 may be formed about an axis X and arranged to include an axially extending internal passage 15 opening out of the sleeve at its proximal 12b and distal 12a ends when oriented and viewed in a 'state' where it is fitted over the pipe section. In same 'state', a peripheral internal face 13 defining and bounding passage 15 may be arranged to taper slightly in a proximal direction Pr and sleeve 12 may include a peripheral collar 11 at a distal end 12a thereof bulging away from its external face in a direction away from axis X.

The tapering of internal face 13 forms internal diameters $D_p$, $D_d$ at respective proximal 12a and distal 12b regions of the sleeve. These diameters may be chosen to permit on the one hand relative easy manual placement of the sleeve 12 over the pipe section 10 as it is urged distally (due to the larger diameter $D_d$), while providing a so-called 'fastening' utility when the sleeve is in its final position forming a coupling region 7 in the corrugated piping assembly 100 described herein below (due, inter alia, to the smaller diameter $D_p$).

Figure 1B:
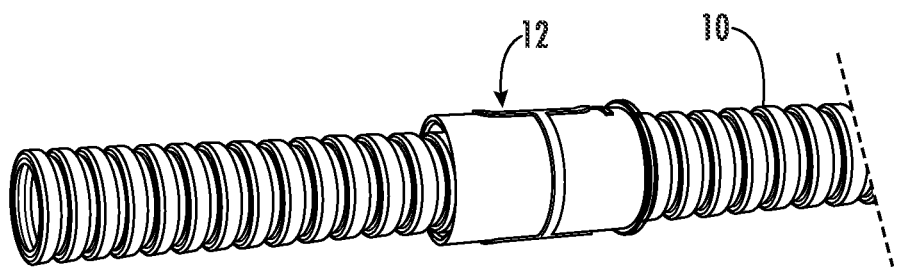

Placing the sleeve 12 over the pipe section 10 (as seen in FIG. 1B) forms a first intermediate state, permitting further steps to be taken in order to form the discussed corrugated piping assembly.

Figure 1C:
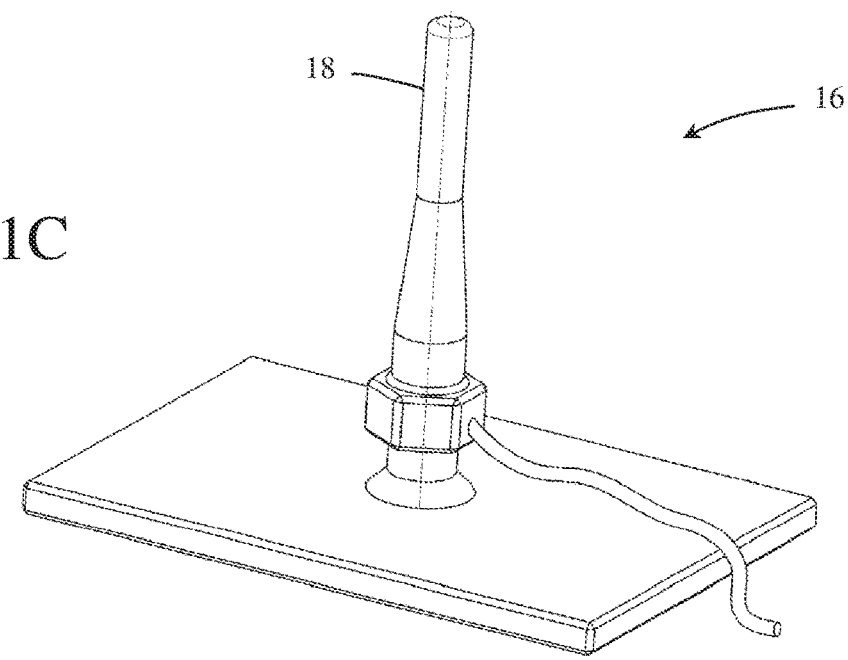
Figure 1D:
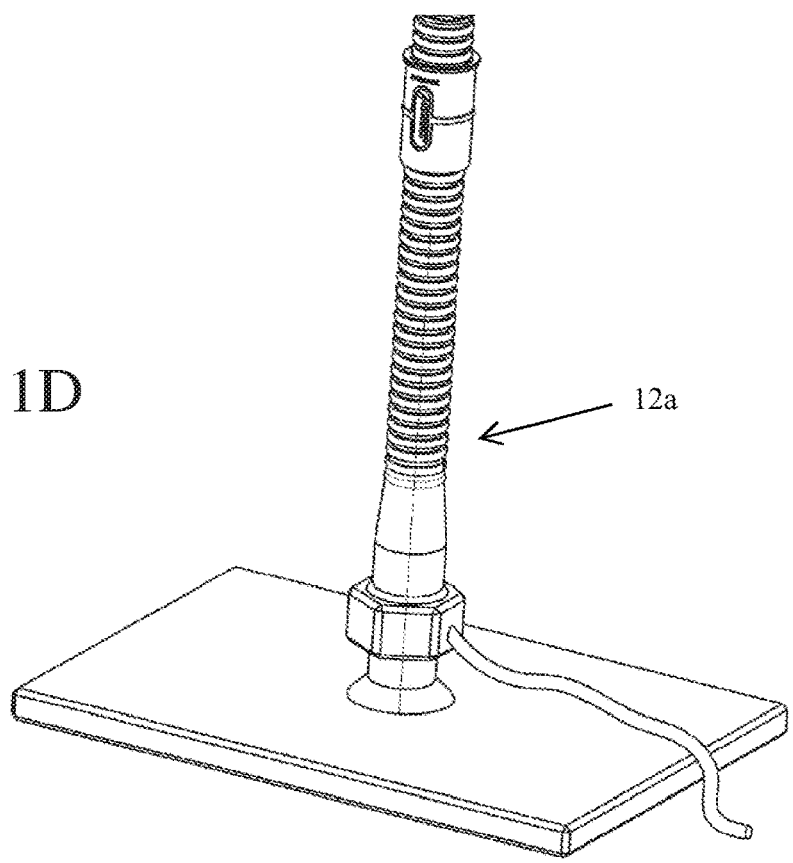

FIGS. 1C and 1D demonstrate such further steps and include use of a possible heating fixture 16. Heating fixture 16 includes a shaft 18 arranged to fit into an open end of pipe section 10, accordingly after forming the first intermediate state of pipe section 10 and sleeve 12. FIG. 1D demonstrates pipe section 10 placed over shaft 18, which in turn heats the internal perimeter of the pipe section adjacent the opening where a coupling region is being formed.

Figure 1E:
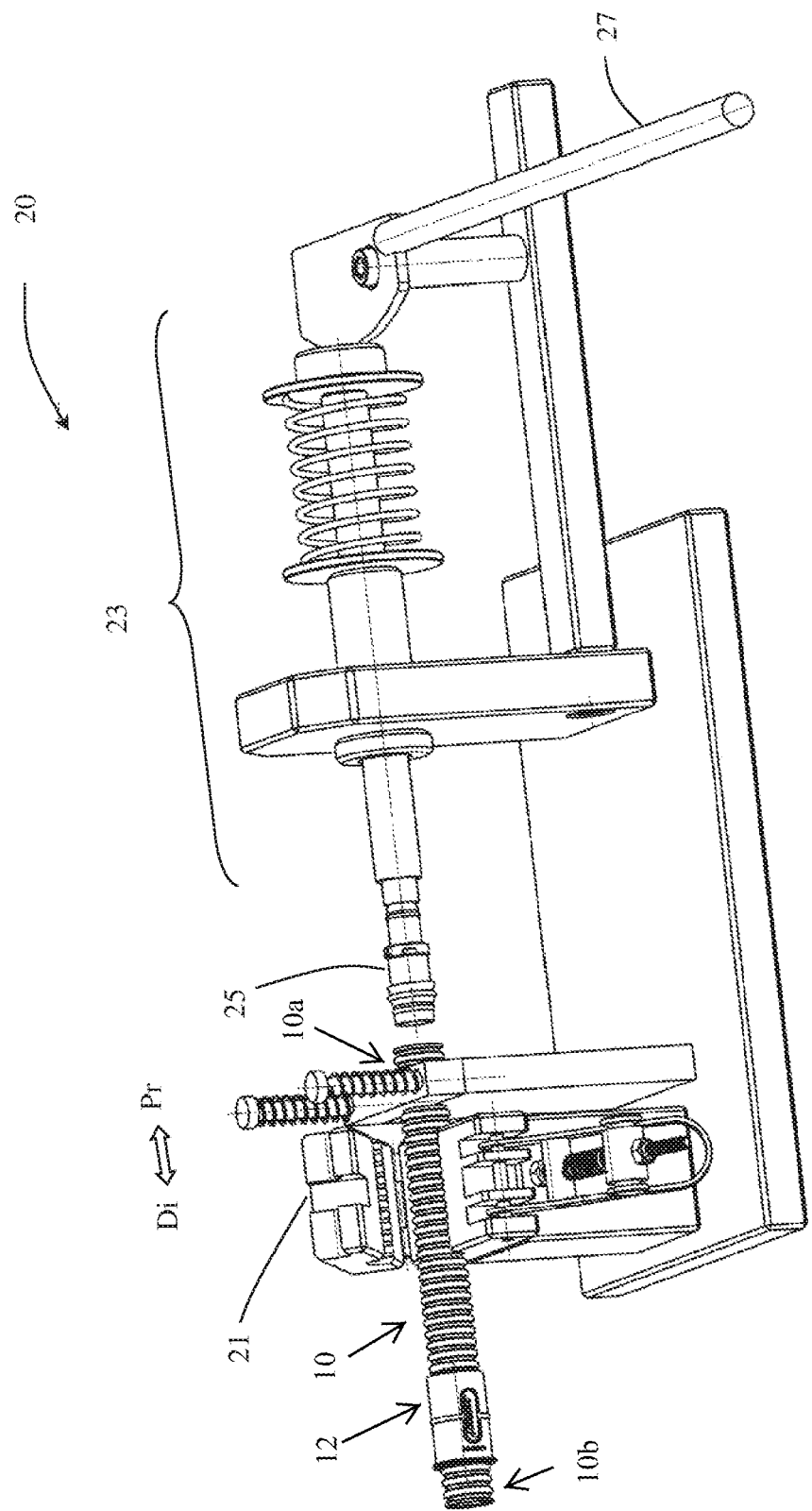

This heating stage permits advancement to a subsequent step in the forming of a coupling region in the corrugated piping assembly as demonstrated in FIG. 1E that makes use of a connector placement fixture 20. The pipe section and sleeve previously brought to the first intermediate state and then subjected to heat adjacent the pipe section's opening, may be placed on fixture 20 positioning the heated opening opposite a connector insertion assembly 23 of the fixture.

The pipe section in this state may be clamped in place adjacent its heated opening by a clamp 21 of the fixture. A connector 25 placed on the connector insertion assembly 23 may be oriented opposite the heated opening and then urged into the opening, in this example by manually manipulating a lever 27 of the fixture.

Insertion of the connector 25 into the pipe section 10, forms a second intermediate state including pipe section 10, connector 25 fitted in the opening of the pipe section and sleeve 12 slidably placed over the pipe section at a position distal to the connector.

Figure 1F:
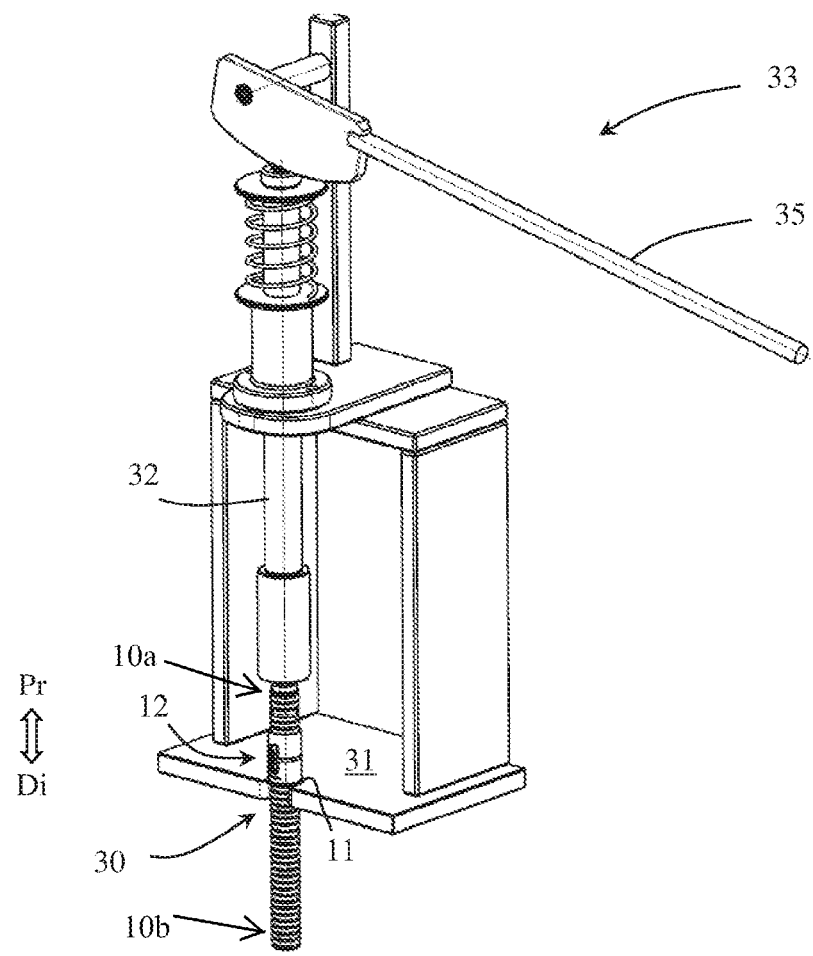

The arrangement of the second intermediate state may then be transferred to a subsequent and possibly final assembly station 33, arranged for urging the sleeve 12 over pipe section where it fits over connector 25. This may be accomplished by placing the sleeve 12 with its collar 11 bearing against a support 31 of the final assembly station, with portions of the pipe section distal to the sleeve 12 passing through a possible arc shaped opening 30 formed in the support to dangle below. In FIG. 1F, the proximal end 10a, and thus, the opening, of the pipe section 10 where the connector is fitted in this view is positioned above the sleeve.

Urging downwards a shaft 32 of the station to bear against the connector urges the connector 25 together with the pipe section 10 downwards and towards the sleeve 12 that remains fixed in place at the support. This action may be manually manipulated by a lever 35 of the final assembly station.

The connector 25 and pipe section 10 may be urged axially downwards until the connector axially meets the sleeve—thus forming a coupling region 7 at an end of the corrugated piping assembly 100 illustrated in FIGS. 2A and 2B. In this assembly, the pipe section 10 is pressed in between the sleeve 12 and the connector 25, in particular due to inward pressing actions applied by the sleeve's internal face 13 at regions adjacent to where face 13 has reduced diameters such as $D_p$.

The cross sectional view of FIG. 2C illustrates an embodiment where the pipe section includes a non-corrugated 'cuff' region adjacent its open end, and thus the coupling region of the corrugated piping assembly in this example includes pressing the 'cuff' region (as opposed to corrugations) in-between the sleeve 12 from outside and the connector 25 from inside.

The sleeve 12 in addition acts in coupling regions 7 within corrugated piping assembly 100 as a so-called protector enveloping and securing the region 7 of interaction/coupling between the pipe section and the connector—against wear and tear that may occur during use in an agricultural field. Seen in the cross section of FIG. 2B is presence of a possible seal 17 that may be held pressed between the connector 25 and the pipe section 10 in order to seal against egress of liquid out of the corrugated piping assembly's coupling region 7. Possibly the seal may be snugly received within a corrugation of section 10 and connector 25 may include one of barbs on its outer side and possibly seal 17 may be axially pressed against one of the barbs.

Figure 3:
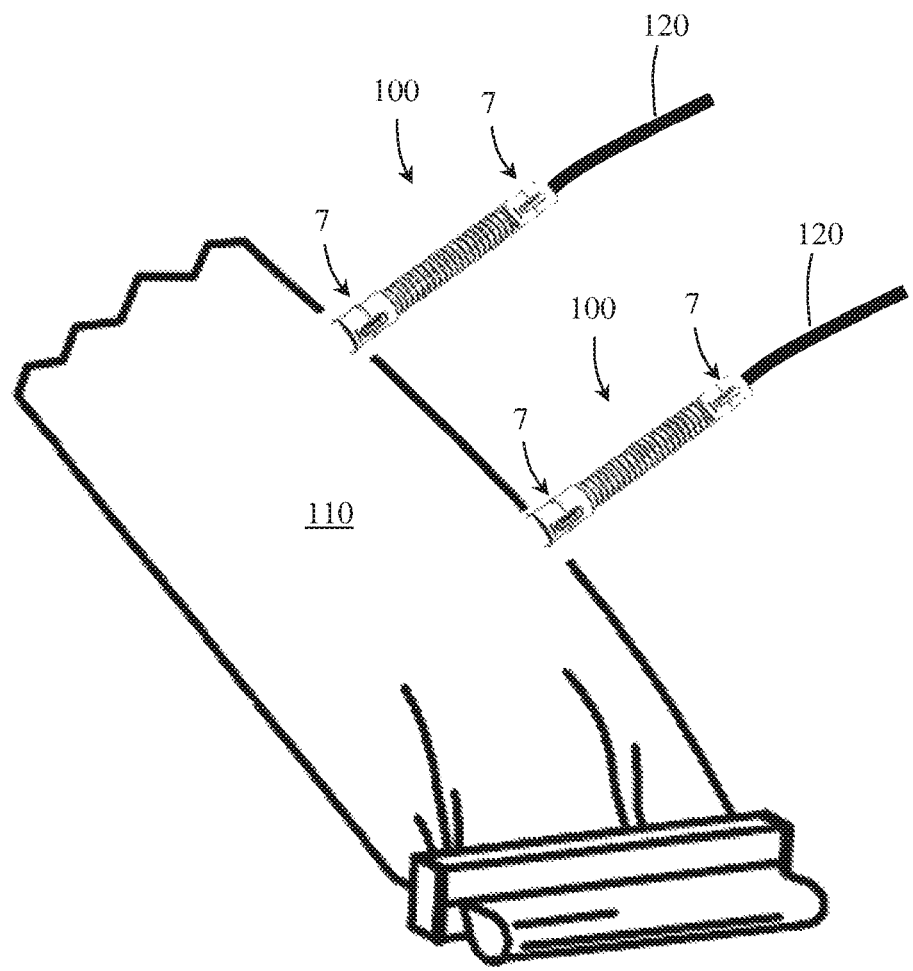
FIG. 3 schematically shows exemplary use of an embodiment of a corrugated piping assembly in an irrigation system.

Attention is drawn to FIG. 3 exemplifying one possible use in the field of an embodiment of a corrugated piping assembly 100, here being used to bridge and fluidly communicate between a main distribution pipe 110 and drip irrigation pipes 120. Each corrugated piping assembly 100 is here seen including coupling regions 7 at both ends. One of the coupling regions 7 being arranged to couple and communicate with main distribution pipe 110 and at the other coupling region 7 being arranged to couple and communicate with a drip irrigation pipe 120 branching away from the main distribution pipe 110 to irrigate crops in a field.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A corrugated piping assembly for use in an irrigation system for bridging between different pipe sections and/or irrigation appliances, the corrugated piping assembly comprising:
    a connector;
    a corrugated pipe section having an open end, the open end fitted over the connector to form a coupling region, the pipe section axially and radially fixed relative to the connector; and
    a protective sleeve overlaying a region where the pipe section fits over the connector at the coupling region, the protective sleeve having a first sleeve end adjacent the open end of the pipe section and a second sleeve end, wherein:
        the protective sleeve is arranged to press inwards against the pipe section to press the pipe section against portions of the connector;
        the protective sleeve comprises an internal through going passage and an internal face surrounding the passage; and
        the protective sleeve's internal face tapers inward from the second sleeve end towards the first sleeve end.

2. The corrugated piping assembly of claim 1, wherein the pressing inwards of the sleeve is such that the pipe section is pressed in between the sleeve and portions of the connector located within the pipe section to secure the pipe section to the connector.

3. The corrugated piping assembly of claim 1, wherein the sleeve comprises an external collar at the second sleeve end, for assisting in urging the sleeve over the pipe section where it fits over the connector when forming the corrugated piping assembly.

4. The corrugated piping assembly of claim 1, configured to provide fluid communication between a main distributing pipe and a drip irrigation pipe branching away from the main distributing pipe.

5. The corrugated piping assembly of claim 1, further comprising a seal at the coupling region pressed between the sleeve and the pipe section.

6. A method of forming a coupling region of a corrugated piping assembly, comprising the steps of:
    providing a corrugated pipe section having a proximal end and a distal end;
    providing a sleeve having first and second sleeve ends, the sleeve comprising an internal through going passage between the first and second sleeve ends, and an internal face surrounding the passage, the internal face tapering slightly inward from the first sleeve end to the second sleeve end;
    arranging the sleeve over the pipe section such that the sleeve is axially slidable along the pipe section, with the second sleeve end facing the pipe section's proximal end;
    urging a connector into the proximal end of the pipe section; and
    urging the sleeve axially along the pipe section in a proximal direction until the sleeve fits over the connector such that the pipe section is axially and radially fixed to the connector.

7. The method of claim 6, wherein urging the connector into the proximal end of the pipe section comprises first heating the proximal end.

8. The method of claim 6, wherein urging the sleeve along the pipe section until the sleeve fits over the connector, comprises:
    fixing the sleeve in place by placing it against a support; and
    simultaneously urging both the connector and pipe section towards the fixed sleeve, until the sleeve fits over connector at the proximal end of the pipe section and thereby forms the coupling region.

9. The method of claim 8, wherein the sleeve comprises an external collar, and fixing the sleeve against the support comprises abutting the collar against the support.

10. A corrugated piping assembly for use in an irrigation system for bridging between different pipe sections and/or irrigation appliances, the corrugated piping assembly comprising:
    a corrugated pipe section having a pipe proximal end and an opposite, pipe distal end;
    a first connector having first and second connector ends; and
    a first sleeve having a sleeve axis (X) and first and second sleeve ends, the sleeve comprising an internal through going passage and an internal face surrounding the passage, the internal face tapering inward in a direction from the first sleeve end to the second sleeve end; wherein:
        the first connector end is located inside the pipe proximal end, while the second connector end remains outside of the pipe proximal end;
        the first sleeve overlays the pipe proximal end where the first connector end is located, with the first sleeve end located between the pipe proximal end and the pipe distal end; and
        the first sleeve is configured to press inwardly against the pipe proximal end, such that the pipe proximal end is pressed against at least a portion of the first connector end such that the pipe is axially and radially fixed to the connector, thereby forming a first coupling region of the corrugated piping assembly.

11. The corrugated piping assembly of claim 10, wherein: the first sleeve comprises an external collar at the first sleeve end.

12. The corrugated piping assembly of claim 10, further comprising a seal at the first coupling region pressed between the first sleeve and the pipe section's proximal end.

13. The corrugated piping assembly of claim 10, wherein: at least a portion of the proximal pipe end comprises a cuff portion devoid of corrugations.

14. The corrugated piping assembly of claim 10, wherein: the second connector end is provided with a threaded portion.

15. The corrugated piping assembly of claim 10, wherein:
the connector is provided with a connector stop between the first and second connector ends;
the sleeve is provided with a second sleeve abutment at the second sleeve end; and
the second sleeve abutment abuts the connector stop.

16. The corrugated piping assembly of claim 10, further comprising a second coupling region formed at the pipe distal end.

17. An irrigation system comprising:
a main distribution pipe;
a drip irrigation pipe branching away from the main distribution pipe; and
the corrugated piping assembly of claim 16 connecting the main distribution pipe to the drip irrigation pipe.

18. An irrigation system comprising:
a main distribution pipe;
a drip irrigation pipe branching away from the main distribution pipe; and
the corrugated piping assembly of claim 10 connecting the main distribution pipe to the drip irrigation pipe.

* * * * *